(12) United States Patent
Motoki et al.

(10) Patent No.: US 6,408,883 B2
(45) Date of Patent: Jun. 25, 2002

(54) ELECTROMAGNETIC VALVE

(75) Inventors: Atsushi Motoki, Kariya; Motoyoshi Ando, Nagoya, both of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/768,223

(22) Filed: Jan. 25, 2001

(30) Foreign Application Priority Data

Jan. 26, 2000 (JP) ........................................ 2000-017018

(51) Int. Cl.⁷ ........................ F15B 13/043; F15B 13/044
(52) U.S. Cl. ........................... 137/625.64; 137/625.65; 137/625.68
(58) Field of Search ..................... 137/625.65, 625.68, 137/625.64

(56) References Cited

U.S. PATENT DOCUMENTS

| | | | |
|---|---|---|---|
| 4,491,153 A | * 1/1985 | Bartholomaus | ........ 137/625.65 |
| 4,548,383 A | * 10/1985 | Wolfges | ........... 137/625.68 X |
| 5,051,631 A | 9/1991 | Anderson | |
| 5,246,033 A | * 9/1993 | Brehm et al. | .......... 137/625.65 |
| 6,269,827 B1 | * 8/2001 | Potter | ................ 137/625.68 X |

FOREIGN PATENT DOCUMENTS

| | | | |
|---|---|---|---|
| DE | 31 35 261 | * 3/1983 | ............ 137/625.65 |
| JP | 7-269724 | 10/1995 | |
| JP | 9-166238 | 6/1997 | |
| JP | 10-231946 | 9/1998 | |
| JP | 10-289018 | 10/1998 | |

OTHER PUBLICATIONS

International Publication No. WO 90/07669, published Dec. 7, 1990.*

* cited by examiner

Primary Examiner—Gerald A. Michalsky
(74) Attorney, Agent, or Firm—Nixon & Vanderhye PC

(57) ABSTRACT

Since an output port is formed at a front end portion of a sleeve, an electromagnetic valve is arranged in series with a control valve. Thus, a system becomes small, and it becomes easy to attain a mounting space. Further, since a feedback chamber is formed in the vicinity of the linear solenoid, it is possible to install a spool after the sleeve is attached to the linear solenoid. Thus, unidirectional assembling becomes possible, and the number of assembling steps is decreased. Furthermore, since a small-diameter land is provided in the spool at a side of the linear solenoid, a small-diameter inner wall for slidably guiding the small-diameter land is concentrated to one place at the side of the linear solenoid. Thus, forming a small-diameter hole in the sleeve becomes easy, and forming accuracy is improved.

7 Claims, 5 Drawing Sheets

ELECTROMAGNETIC VALVE

CROSS REFERENCE TO RELATED APPLICATION

This application is based on and incorporates herein by reference Japanese Patent Application No. 2000-17018 filed on Jan. 26, 2000.

BACKGROUND OF THE INVENTION

1. Field of the Invention

The present invention relates to an electromagnetic valve for controlling the pressure of a fluid.

2. Description of the Related Art

Conventionally, as an electromagnetic valve for controlling the pressure of a fluid in response to an electric signal, a spool valve type electromagnetic valve including a spool valve is known. As an example of such a spool valve type electromagnetic valve, there is a pressure adjusting valve disclosed in JP-A-9-166238 and JP-A-10-231946.

In the pressure adjusting valves disclosed in JP-A-9-166238 and JP-A-10-231946, a valve sleeve includes a supply port, an output port and a discharge port. A spool valve axially slides in the valve sleeve. An attracting force of an electromagnet, a spring force and an output pressure feedback force act on the spool valve, and these forces are balanced. By this, the supply pressure of a fluid supplied to the supply port is adjusted to an output pressure corresponding to an input electric signal into an electromagnet portion when this fluid flows out of the output port.

Here, according to the pressure adjusting valve disclosed in JP-A-9-166238, for example as shown in FIG. 4, a pressure adjusting valve 9 includes a sleeve 7 and a spool 8 slidable in an axial direction in the sleeve 7. In the sleeve 7, a discharge port 1 communicating with a slide hole 5 and opening in the outer periphery of the sleeve 7, an output port 2, a supply port 3, and a feedback port 4 are arranged in this sequence from the side of a driving portion 10 for the sleeve 7. A feedback chamber 6 is formed at a front side of the pressure adjusting valve 9 so as to communicate with the feedback port 4.

According to the pressure adjusting valve disclosed in JP-A-10-231946, for example as shown in FIG. 5, a spool valve 109 is attached to a front end face of a linear solenoid 101, and the spool valve 109 accommodates a spool 103 slidably in a sleeve 102. In the sleeve 102, a drain port 104, an output port 105, an input port 106, and a feedback port 107 are formed in sequence from the rear side. A feedback chamber 108 is provided at a front side end portion of the spool 103 so as to communicate with the feedback port 107.

However, in the conventional electromagnetic valves shown in FIGS. 4 and 5, since the output ports 2 and 105 are formed in the radial directions of the sleeves 7 and 10, it is necessary to arrange the electromagnetic valve in parallel with a control valve. Thus, the system becomes large and it becomes difficult to attain a mounting space.

In the electromagnetic valve shown in FIG. 4, the feedback chamber 6 is formed at the front side of the pressure adjusting valve 9, and the spool 8 has a large diameter at the rear side thereof, and has a small diameter at the front side thereof. Thus, when the electromagnetic valve is attached, it is necessary to attach the pressure adjusting valve 9 to the driving portion 10 after the spool 8 is installed into the sleeve 7. The spool 8 has to be frontwardly installed and the pressure adjusting valve 9 has to be rearwardly attached. That is, unidirectional assembling is impossible, thereby increasing the number of fitting steps.

In the electromagnetic valve shown in FIG. 5, since the feedback chamber 108 is formed at the front side end of the spool 103, the spool 103 has to have a small diameter over the whole length. Thus, it is necessary to form a precise hole with a small diameter in the axial direction of the sleeve 102, and the axial length thereof is long with respect to the hole diameter, so that it is difficult to attain a working accuracy.

SUMMARY OF THE INVENTION

A first object of the present invention is to provide an electromagnetic valve by which a system is small and it is easy to attain a mounting space.

A second object of the present invention is to provide an electromagnetic valve in which the number of assembling steps is decreased, and assembling accuracy is improved.

According to a first aspect of the present invention, a sleeve includes a first fluid passage passing through a cylindrical peripheral wall, and a second fluid passage opening and formed at an axial end of the sleeve. A magnetic driving portion is fixed to the sleeve at a side opposite to an opening end of the second fluid passage, and generating a driving force. A movable member is slidably supported by an inner wall of the sleeve and receives a magnetic attracting force of the magnetic driving portion, and the movable member includes a third fluid passage communicating with the first and the second fluid passages and reciprocates to switch a communication of the first fluid passage. An urging means for urges the movable member against the magnetic attraction force, and the means is accommodated inside the sleeve.

By making the second fluid passage an output port, the output port is arranged at the side opposite to the magnetic driving portion. Thus, since an electromagnetic valve is arranged in series with a control valve as a control object, a system becomes small, and it becomes easy to attain a mounting space.

According to a second aspect of the present invention, a feedback chamber is formed in the sleeve in a vicinity of the magnetic driving portion and communicates with the first fluid passage. The electromagnetic valve regulates a position of the movable member by a force received from a feedback pressure in the feedback chamber.

By this, the movable member has a small diameter at a side of the magnetic driving portion, and has a large diameter at a side opposite to the magnetic driving portion. Thus, the movable member is installed after the sleeve is attached to the magnetic driving portion. Thus, unidirectional attachment becomes possible and the number of assembling steps is decreased.

According to a third aspect of the present invention, the movable member includes a small-diameter portion slidably supported by the inner wall of the sleeve at a side of the magnetic driving portion. Thus, it is possible to locate a small-diameter hole formed in the sleeve to one place at the side of the magnetic driving portion. Thus, forming the small-diameter hole in the sleeve becomes easy, and forming accuracy is improved, thereby improving the accuracy of oil pressure control.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

Figure 1:
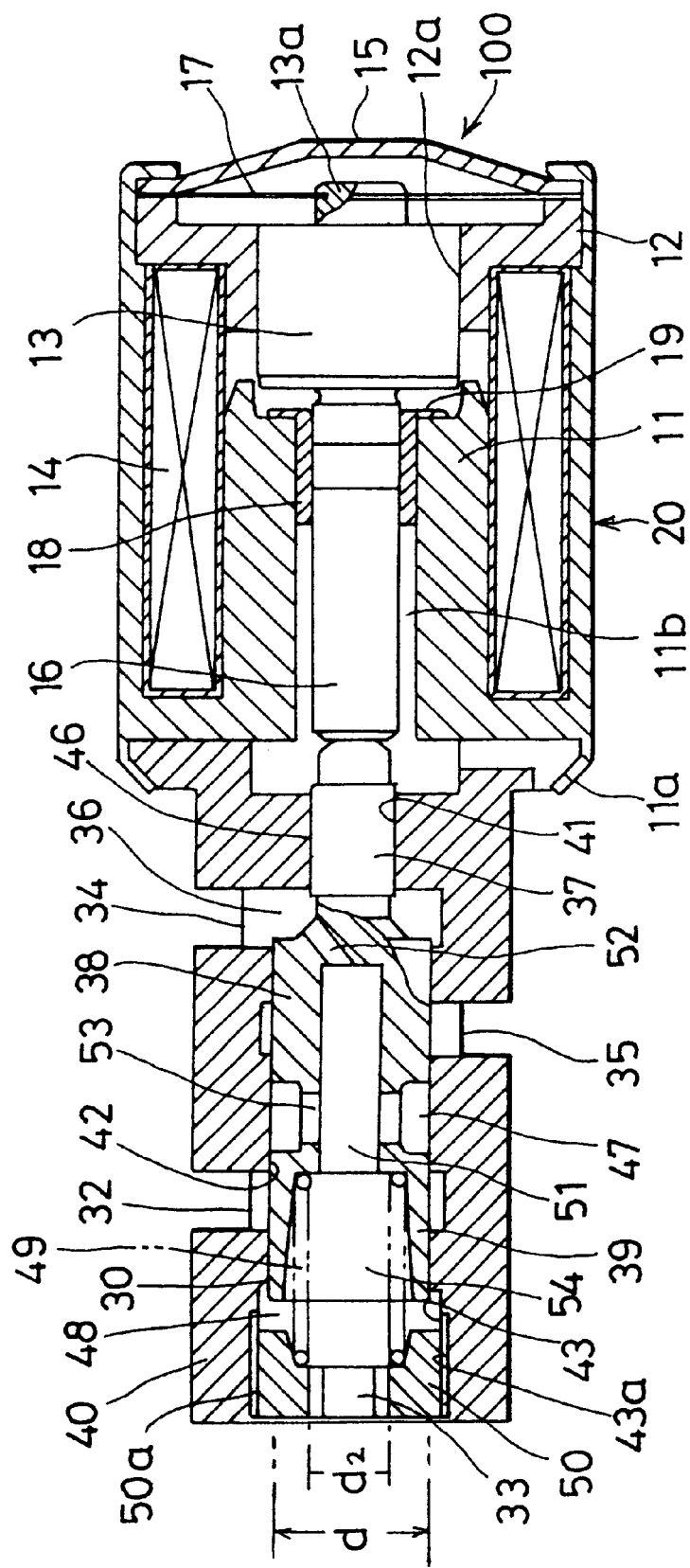
FIG. 1 is a cross-sectional view showing an electromagnetic valve, and showing an intermediate position of a plunger and a spool.
Figure 2:
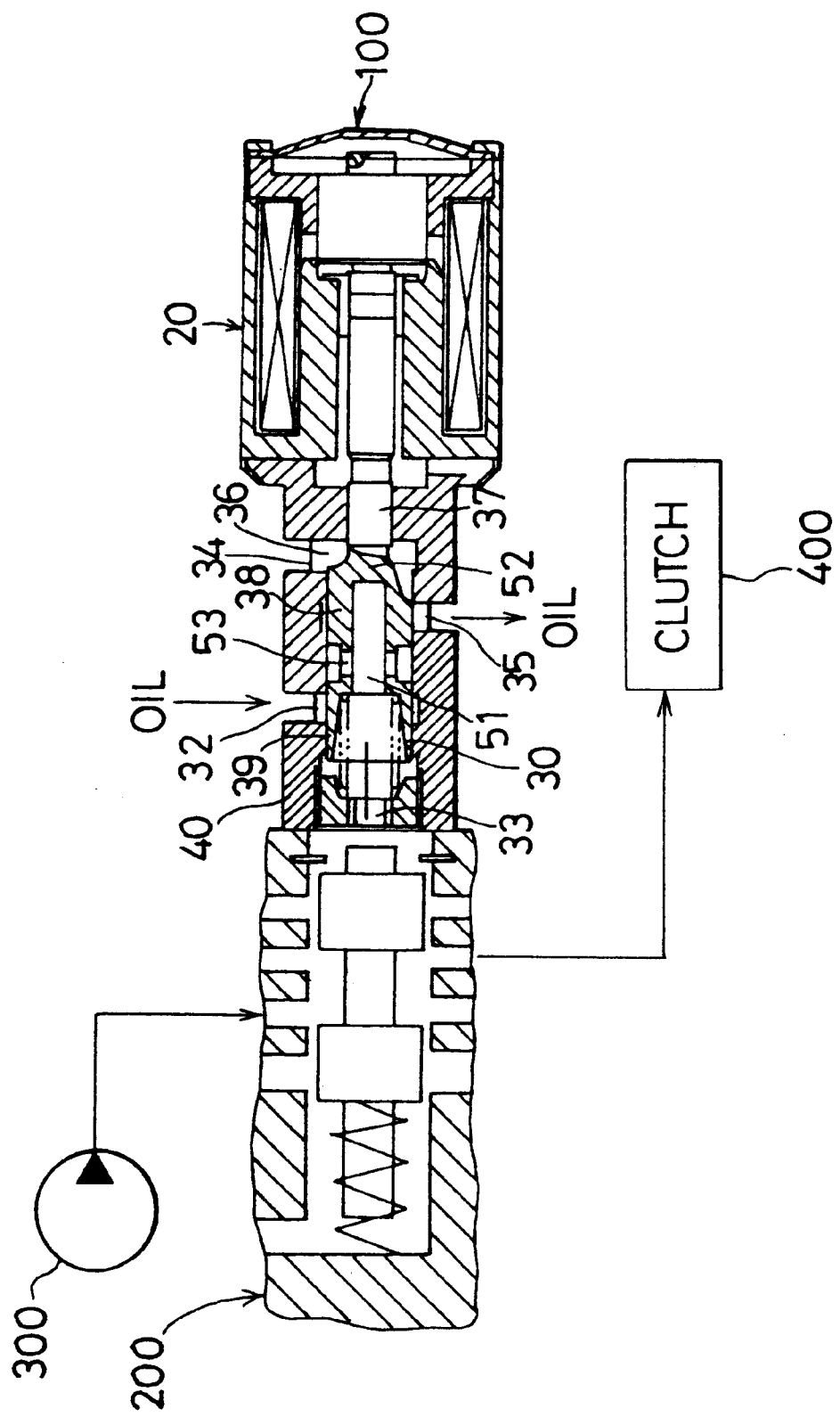
FIG. 2 is a cross-sectional view showing a state where the electromagnetic valve is attached to a control valve.

FIGS. 1 and 2 show an embodiment in which an electromagnetic valve of the present invention is applied to a spool type oil pressure control valve for controlling the oil pressure of operating oil supplied to an oil pressure control device of an automatic transmission of a vehicle or the like. An electromagnetic valve 100 of this embodiment is, as shown in FIG. 2, attached to a control valve 200.

A linear solenoid 20 as an electromagnetic driving portion includes a stator core 11, a yoke 12, a plunger 13, a coil 14, an end plate 15, a shaft 16, and the like. The stator core 11, the yoke 12, the plunger 13, and the end plate 15 are made of magnetic material.

The cylindrical yoke 12 is mechanically fixed to a rear end of the cylindrical stator core 11. The coil 14 is molded by resin into a cylindrical shape and is supported by the yoke 12 and the stator core 11. The end plate 15, together with the yoke 12, is mechanically fixed to the rear end of the stator core 11. The plunger 13 is disposed concentrically to the stator core 11 and faces thereto. An opposite spool side end 13a of the plunger 13 is supported by a plate spring 17 to be allowed to reciprocate in a space 12a inside the yoke 12. The shaft 16 is press inserted into the plunger 13, and one end of the shaft 16 is in contact with one end of a spool 30. The shaft 16 axially moves with plunger 13, and is supported by a bearing 18 to be allowed to reciprocate in a hollow portion 11b.

When an electric current is supplied to the coil 14 from a terminal (not illustrated) electrically connected to the coil 14, a magnetic flux is generated in a magnetic circuit including the yoke 12, the plunger 13, and the stator core 11, and a magnetic attracting force is generated between the stator core 11 and the plunger 13. Then, the plunger 13 axially frontwardly (toward the left direction in FIG. 1) moves. The movement of the plunger 13 is restricted by a stopper 19 of the bearing 18.

The plate spring 17 supports the opposite spool side end 13a of the plunger 13. The end 13a of the plunger 13 is supported by the plate spring 17, so that it is possible to prevent contact between the plunger 13 and the inner wall of the space 12a, and it is not necessary to use bearings or the like for supporting the plunger 13. The contact between the plunger 13 and the inner wall of the space 12a is prevented, so that the movement resistance of the plunger 13 is reduced, thereby reducing the hysteresis of attracting force characteristics with respect to a stroke of the spool 30.

A sleeve 40 which is mechanically fixed to a front end portion 11a of the stator core 11 has a substantially cylindrical shape, and internally accommodates the spool 30 to allow it to freely reciprocate. A through hole passing through the sleeve 40 in the axial direction is formed inside the sleeve 40. The through hole includes a slide hole 46 defined by a small-diameter inner wall 41, a slide hole 47 defined by a medium-diameter inner wall 42 and communicating with the slide hole 46, and a spring chamber 48 defined by a large-diameter inner wall 43 and communicating with the slide hole 47. The small-diameter inner wall 41, the medium-diameter inner wall 42, and the large-diameter inner wall 43 are provided in this sequence from the rear side of the sleeve 40. A female screw 43a is formed in the large-diameter inner wall 43.

An input port 32, an output port 33, a feedback port 34, and a discharge port 35 are formed in the sleeve 40. The input port 32 is a port through which operating oil supplied from an oil tank by an oil pump 300 shown in FIG. 2 flows after pressure adjustment. The input port 32 is bored and formed in the outer periphery so as to pass through a peripheral wall of the sleeve 40. The output port 33 is a port for supplying the operating oil to a clutch 400 of an automatic transmission via the control valve 200 shown in FIG. 2. The output port 33 is bored and formed at a front end of the sleeve 40. The feedback port 34 is bored and formed in the outer periphery so as to pass through the peripheral wall of the sleeve 40. The output port 33 and the feedback port 34 communicate with each other at the inside and the outside of the electromagnetic valve 100. Some operating oil flowing out of the output port 33 is introduced into the feedback port 34. The discharge port 35 is a port for discharging the operating oil into the oil tank. The discharge port 35 is bored and formed in the outer periphery so as to pass through the peripheral wall of the sleeve 40. Here, the input port 32, the feedback port 34, and the discharge port 35 constitute a first fluid passage, and the output port 33 constitutes a second fluid passage.

A small-diameter land 37, a large-diameter land 38, and a large-diameter land 39 are formed in the spool 30 as a movable member in this sequence from the rear side of the spool 30. The small-diameter land 37 has an outer diameter smaller than the large-diameter lands 38 and 39, and is guided by the small-diameter inner wall 41. Since the small-diameter land 37 always contacts the shaft 16 of the linear solenoid 20, the spool 30 receives the movement of the plunger 13 and reciprocates in the sleeve 40. The feedback port 34 and a feedback chamber 36 communicating with a through hole 52 are formed between the small-diameter land 37 and the large-diameter land 38. That is, the feedback chamber 36 is formed in the sleeve 40 and in the vicinity of the linear solenoid 20. The large-diameter lands 38 and 39 are guided by the medium diameter inner wall 42, and include an axial direction hole 51 to communicate with the output port 33 via a spring chamber 54 and the spring chamber 48 formed in the sleeve 40. The axial direction hole 51 and the through hole 52 communicating with the feedback chamber 36 are formed in the large-diameter land 38, and a horizontal hole 53 communicating with the axial direction hole 51 and capable of communicating with the input port 32 or the discharge port 35 is formed between the large-diameter land 38 and the large-diameter land 39. The spring chamber 54 communicating with the spring chamber 48 and the axial direction hole 51 is formed in the large-diameter land 39. Here, the axial direction hole 51, the through hole 52 and the horizontal hole 53 constitute a third fluid passage.

The feedback chamber 36 is formed between the small-diameter land 37 and the large-diameter land 38, and areas where a feed back oil pressure operates vary in accordance with the difference between the outer diameters of the lands 37 and 38. Here, when the outer diameter of the large-diameter lands 38 and 39 is made $d_1$, and the outer diameter of the small-diameter land 37 is made $d_2$, the oil pressure of the feedback chamber 36 acts to press the spool 30 frontwardly away from the linear solenoid 20 by a force generated in an annular area with a diameter of $(d_1-d_2)$. On the other hand, it acts on the front end portion of the large-diameter land 39 so as to press the spool 30 rearwardly toward the linear solenoid 20 by a force generated in a circular area with a diameter of $d_1$. Thus, as the difference between the above forces, a force generated in a circle area with a diameter of $d_2$ acts on the spool 30 rearwardly toward the linear solenoid 20. Some oil pressure outputted from the electromagnetic valve 100 is fed back in order to prevent the output pressure from fluctuating by the fluctuation of supplied oil pressure, that is, input pressure.

An adjust screw 50 is fixed to the front end portion of the sleeve 40. The adjust screw 50 includes on its outer periphery a male screw 50a for engaging with the female screw 43a. The adjust screw 50a is a cylindrical member made of a material with a good mechanically transformed property, such as an aluminum forged product. The inner wall of the adjust screw 50a forms the output port 33.

One end of a coil spring 49 as energizing means provided in the spring chambers 48 and 54 is attached to an inner bottom surface of the spring chamber 54 formed in the large-diameter land 39, and the other end thereof is attached to an inner bottom surface of the spring chamber 48 formed in the adjust screw 50. The coil spring 49 urges the spool 30 rearwardly toward the linear solenoid 20, and allows the small-diameter land 37 to contact with the shaft 16.

A fitting method of the electromagnetic valve 100 of the above structure will be described.

The sleeve 40 is mechanically fixed to the linear solenoid 20, and after the spool 30 is installed in the sleeve 40, the coil spring 49 is inserted from the front end opening of the sleeve 40. Next, the male screw 50a of the adjust screw 50 is engaged with the female screw 43a. By rotating the adjust screw 50, the adjust screw 50 rearwardly moves in the axial direction in the sleeve 40, and an attachment force of the coil spring 49 is adjusted. After the attachment force of the coil spring 49 is adjusted to a predetermined value, threads of the male screw 50a are crushed, so that the adjust screw 50 is fixed to the sleeve 40 to prevent more rotation and to prevent the attachment force of the coil spring 49 from being changed by loosening of the adjust screw 50, or the like.

The spool 30 installed by the above method comes to rest at the position where urging force of the coil spring 49, pushing force of the plunger 13 to the spool 30 by resultant force of electromagnetic attracting force generated in the stator core 11 and spring force of the plate spring 17 balances with force that the spool 30 receives from the oil pressure of the feedback chamber 36.

The flow rate of the operating oil flowing from the input port 32 to the output port 33 is determined by a seal length that is an overlapping length between the medium-diameter inner wall 42 of the sleeve 40 and the outer wall of the large-diameter land 39. When the seal length becomes short, the amount of the operating oil flowing from the input port 32 via the horizontal hole 53, the axial direction hole 51, and the spring chambers 54 and 48 to the output port 33 is increased. When the seal length becomes long, the amount of the operating oil flowing from the input port 32 via the horizontal hole 53, the axial direction hole 51, and the spring chambers 54 and 48 to the output port 33 is decreased. Similarly, the amount of the operating oil flowing from the output port 33 via the horizontal hole 53 and the axial direction hole 51 to the discharge port 35 is determined by the seal length between the medium-diameter inner wall 42 and the outer peripheral wall of the large-diameter land 38.

When the spool 30 moves frontwardly toward the coil spring 49 by supplying the electric current to the coil 14, the seal length between the medium-diameter inner wall 42 and the large-diameter land 39 becomes short, and the seal length between the medium-diameter inner wall 42 and the large-diameter land 38 becomes long, so that the amount of the operating oil flowing from the input port 32 via the horizontal hole 53, the axial direction hole 51, and the spring chambers 54 and 48 to the output port 33 is increased, and the amount of the operating oil flowing from the output port 33 via the horizontal hole 53 and the axial direction hole 51 to the discharge port 35 is decreased. As a result, the oil pressure of the operating oil flowing out of the output port 33 is increased.

On the other hand, when the spool 30 moves rearwardly toward the linear solenoid 20, the seal length between the medium-diameter inner wall 42 and the large-diameter land 39 becomes long, and the seal length between the medium-diameter inner wall 42 and the large-diameter land 38 becomes short, so that the amount of the operating oil flowing from the input port 32 via the horizontal hole 53, the axial direction hole 51, and the spring chambers 54 and 48 to the output port 33 is decreased, and the amount of the operating oil flowing from the output port 33 via the horizontal hole 53 and the axial direction hole 51 to the discharge port 35 is increased. As a result, the oil pressure of the operating oil flowing out of the output port 33 is decreased.

In the electromagnetic valve 100, the value of the electric current supplied into the coil 14 is controlled, so that the force by which the linear solenoid 20 pushes the spool 30 frontwardly away from the linear solenoid 20 is adjusted, and the oil pressure of the operating oil flowing out of the output port 33 is adjusted. When the value of the electric current is increased, the electromagnetic attracting force of the stator core 11 is increased in proportion to the current value, and the force of the shaft 16 to push the spool 30 frontwardly away from the linear solenoid 20 is increased. The spool 30 comes to rest at the position where balance is attained among the force acting on the spool 30 from the plunger 13 by the resultant force of this electromagnetic attracting force and the spring force of the plate spring 17, the urging force of the coil spring 49, and the force which is exerted to frontwardly push the spool 30 by the pressure of the fed back operating oil away from the linear solenoid 20. Thus, the oil pressure of the operating oil flowing out of the output port 33 is increased in proportion to the value of the electric current supplied to the coil 14.

Next, the operation of the electromagnetic valve 100 will be described.

When the electric current supply into the coil 14 is shut-off, the spool 30 comes to rest at the position where the urging force of the coil spring 49, the spring force of the plate spring 17, and the force acting by the oil pressure feedback are balanced with each other. Then, the input port 32 is closed, and the amount of the operating oil flowing from the output port 33 to the discharge port 35 is increased, so that the pressure of the operating oil supplied into the control valve 200 becomes zero (corresponding to atmospheric pressure).

When the electric current supplied into the coil 14 becomes maximum, the electromagnetic attracting force generated between the plunger 13 and the stator core 11 becomes maximum, so that the plunger 13 is attracted by the stator core 11 and moves, together with the spool 30, against the urging force of the coil spring 49. Then, the input port 32 communicates with the output port 33, so that the flow rate of the operating oil flowing from the input port 32 to the output port 33 is increased. Further since the discharge port 35 is closed, the pressure of the operating oil supplied into the control valve 200 becomes maximum.

When the electric current supplied into the coil 14 is controlled so that it becomes smaller than the state of the above case, the electromagnetic attracting force generated between the plunger 13 and the stator core 11 becomes small, and the plunger 13 and the spool 30 are positioned at the intermediate position as shown in FIG. 1. By the movement of the spool 30, the seal lengths between the medium-diameter inner wall 42 of the sleeve 40 and the large-diameter land 39, and between the medium-diameter inner wall 42 and the large-diameter land 38 are changed, so that the pressure of the operating oil supplied into the control valve 200 is changed. In this way, the position of the spool 30 is changed by controlling the electric current supplied into the coil 14. Thus, it is possible to adjust the pressure of the operating oil supplied into the clutch 400 of the automatic transmission via the control valve 200.

Figure 5:
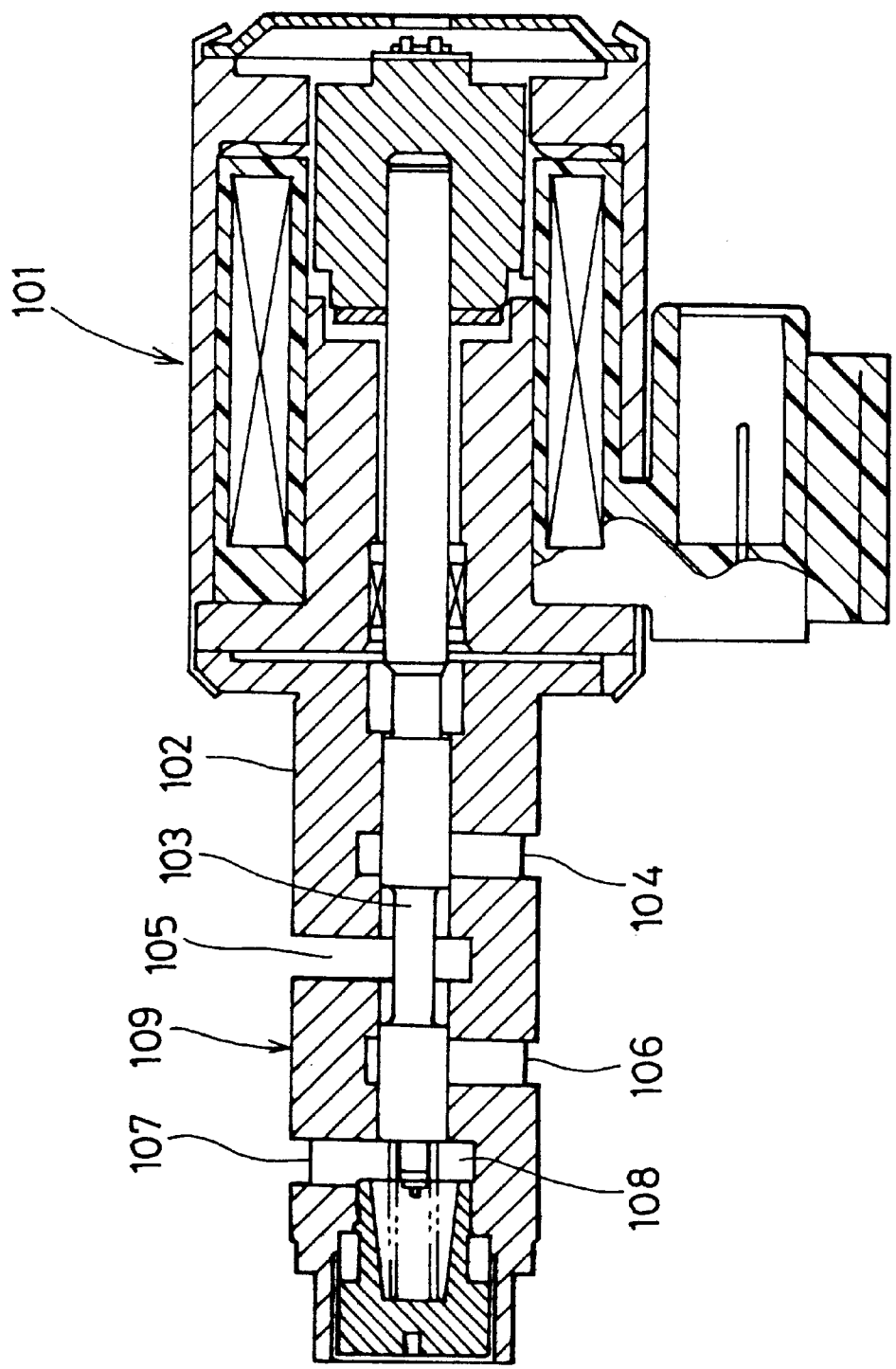
FIG. 5 is a cross-sectional view showing another conventional electromagnetic valve.

Next, a comparison example in which the conventional electromagnetic valve shown in FIG. 5 is attached to the control valve 200 will be described with reference to FIG. 3.

Figure 3:
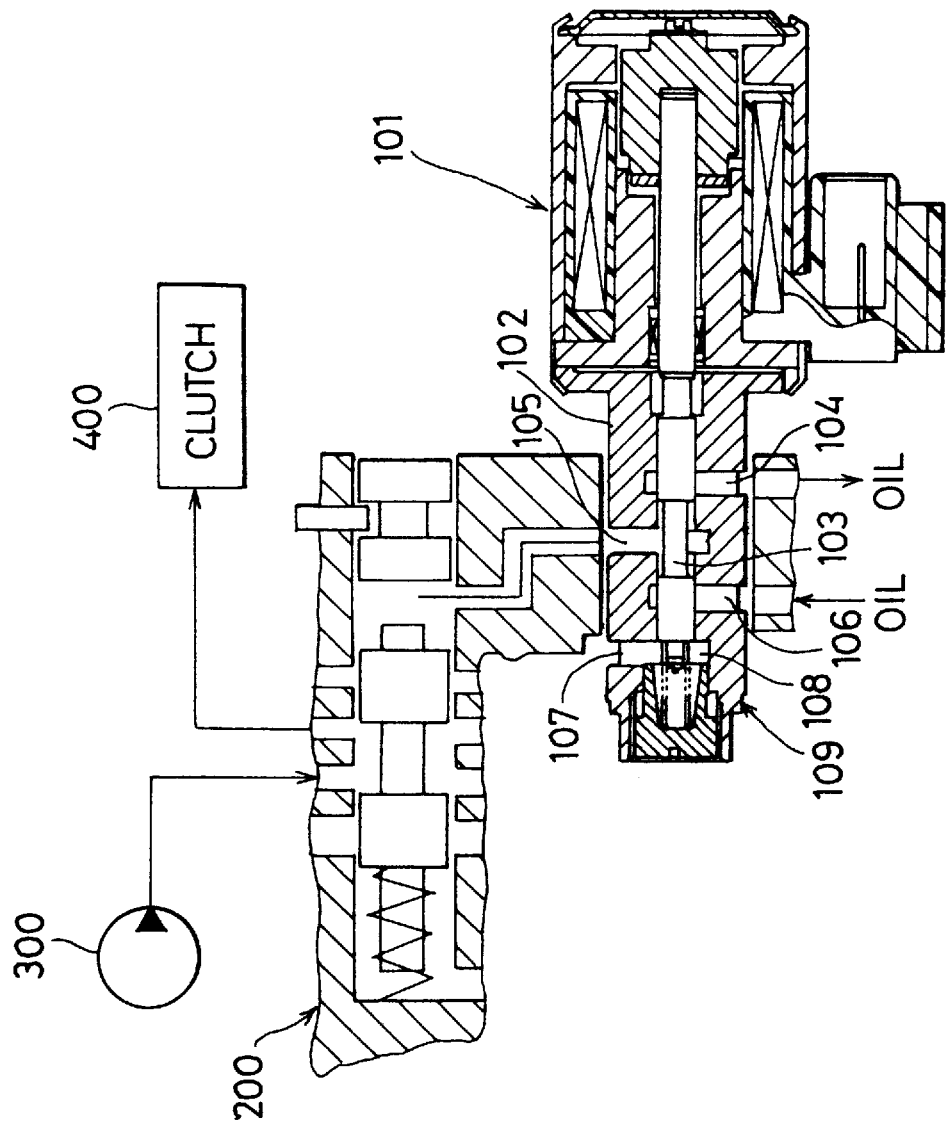
FIG. 3 is a cross-sectional view showing a state where a conventional electromagnetic valve is attached to a control valve.
Figure 4:
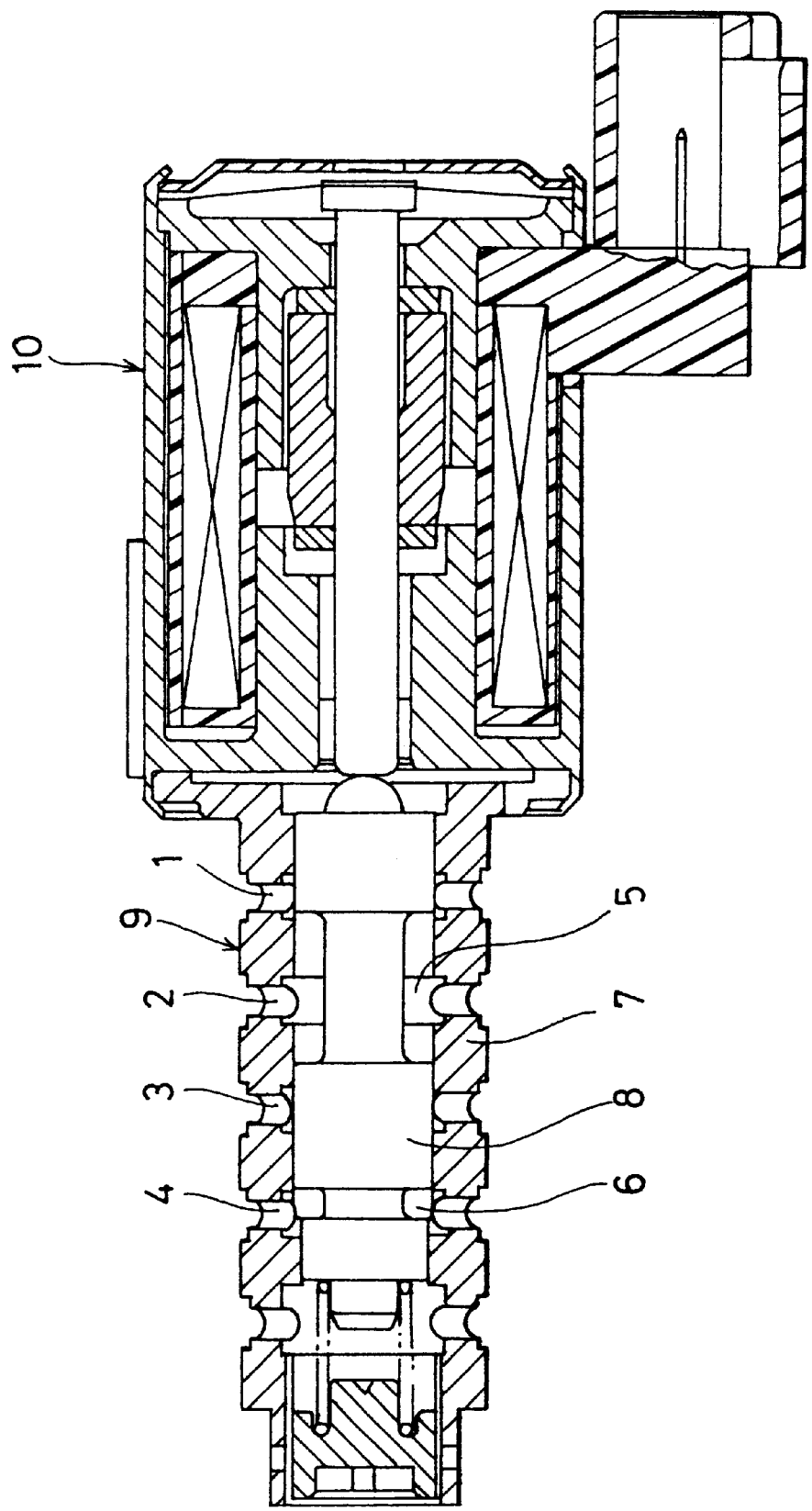
FIG. 4 is a cross-sectional view showing a conventional electromagnetic valve.

As shown in FIG. 3, in the comparison example, since the output port 105 is radially formed in the sleeve 102, the electromagnetic valve is arranged in parallel with the control valve 200. Thus, the system becomes large, and it is difficult to attain a mounting space.

However, in the present embodiment, since the output port 33 is bored and formed at the front end of the sleeve 40 with respect to the linear solenoid 20 in the axial direction, as shown in FIG. 2, the electromagnetic valve 100 can be arranged in series with the control valve 200. Thus, the system becomes small, and it becomes easy to attain a mounting space.

Further, in the present embodiment, since the feedback chamber 36 is formed between the small-diameter land 37 and the large-diameter land 38, that is, in the vicinity of the linear solenoid 20, the spool 30 is made to have the small diameter at the rear and is made to have the large diameter at the front side thereof, so that the spool 30 can be installed after the sleeve 40 is attached to the linear solenoid 20. Thus, both the spool 30 and the sleeve 40 are rearwardly assembled, thereby reducing the number of assembling steps.

Further, according to the present embodiment, since the small-diameter land 37 is provided at the rear end portion of the spool 30, the small-diameter inner wall 41 for slidably guiding the small-diameter land 37 is concentrated to one place at the rear side thereof being close to the linear solenoid 20. Thus, forming a small-diameter hole in the sleeve 40 becomes easy, and the forming accuracy is improved, thereby improving the accuracy of the oil pressure control.

In the embodiment of the present invention described above, the output port 33 is formed at the opposite side end of the sleeve 40 with respect to the linear solenoid 20, the feedback chamber 36 is formed in the vicinity of the linear solenoid 20, and the small-diameter land 37 is provided at the linier solenoid 20 side end of the spool 30. Thus, the system becomes small, it becomes easy to attain a mounting space, the number of assembling steps is decreased, the forming is easy, and the forming accuracy is improved.

In the present embodiment, the electromagnetic valve of the present invention is applied to the spool type oil pressure control valve for controlling the oil pressure of the operating oil supplied to the oil pressure control device of the automatic transmission. Alternatively, the electromagnetic valve may be applied for other purposes as long as the pressure of a fluid is controlled in response to an electric signal.

What is claimed is:

1. An electromagnetic valve comprising:

an electromagnetic driving portion having a plunger reciprocally driven in accordance with a supplied electric current;

a sleeve axially connected with the electromagnetic driving portion, the sleeve having a generally cylindrical wall that defines an axially extending through hole, and a plurality of first fluid passages passing therethrough, the first fluid passages defining an input port and a discharge port, the axially extending through hole including a first portion in which the input and discharge ports are located, a second portion located adjacent the electromagnetic driving portion, a third portion located close to an end of the sleeve which is remote from the electromagnetic driving portion, and a feedback chamber located between the first portion and the second portion, the second portion having a smaller inner diameter than that of the first portion, the third portion having a larger inner diameter than that of the first portion, the sleeve further defining a second fluid passage as an output port which opens at an axial end of the sleeve;

a spool defining a third fluid passage which communicates with the second fluid passage, the spool being a slidably supported in the cylindrical wall of the sleeve and reciprocally operated by the plunger to vary a flow rate of fluid between the input port and the output port and between the discharge port and the output port, the spool being composed of smaller diameter portions than the third portion of the axially extending through hole to be insert into the sleeve from the third portion, and having a first land located in the first portion to control the flow rate between the input port and the output port and between the discharge port and the output port, and a second land located in the second portion; and urging means disposed in the third portion of the sleeve for urging the spool against the plunger.

2. The electromagnetic valve according to claim 1, wherein the input port and the discharge port are offset in an axial direction, and the urging means urges the spool to decrease the flow rate between the input port and the output port.

3. The electromagnetic valve according to claim 2, wherein the third fluid passage in the spool communicates with the feedback chamber.

4. The electromagnetic valve according to claim 3, wherein the electromagnetic driving portion further includes a spring for urging the plunger to an initial position, a position of the spool being defined by a balance between an urging force of the urging means, a fluid pressure acting on the spool, and an urging force of the spring.

5. The electromagnetic valve according to claim 4, wherein the sleeve includes an adjust screw disposed in the axial end of the sleeve to support the urging means, the adjust screw defining the output port therein.

6. The electromagnetic valve according to claim 5, wherein the second land is significantly smaller in diameter than the first land.

7. The electromagnetic valve according to claim 6, wherein the sleeve is disposed on an axial side of a control valve to align the axes thereof, the control valve controlling a fluid supply from a pump to a clutch for an automatic transmission of a vehicle.

* * * * *